US006170525B1

United States Patent
Takats et al.

(10) Patent No.: US 6,170,525 B1
(45) Date of Patent: *Jan. 9, 2001

(54) OPTO-ELECTRIC/HYDRAULIC SERVOACTUATION

(75) Inventors: Imre J. Takats, Bellevue; Kausar Talat, Redmond, both of WA (US)

(73) Assignee: The Boeing Company, Seattle, WA (US)

( * ) Notice: Under 35 U.S.C. 154(b), the term of this patent shall be extended for 0 days.

This patent is subject to a terminal disclaimer.

(21) Appl. No.: 09/208,085

(22) Filed: Dec. 9, 1998

Related U.S. Application Data

(63) Continuation of application No. 08/960,723, filed on Oct. 29, 1997, now Pat. No. 5,875,818, which is a continuation of application No. 08/724,320, filed on Oct. 1, 1996, now abandoned, which is a continuation of application No. 08/310,959, filed on Sep. 23, 1994, now abandoned.

(51) Int. Cl.[7] .................................................. F15B 13/043
(52) U.S. Cl. .................................. 137/625.64; 251/129.04
(58) Field of Search .................... 137/625.64; 251/129.04

(56) References Cited

U.S. PATENT DOCUMENTS

| 3,874,407 | * | 4/1975 | Griswold ..................... 251/129.05 X |
| 4,345,191 | * | 8/1982 | Takats et al. .................. 91/363 A X |
| 4,443,853 | * | 4/1984 | Maciolek et al. ................. 318/580 X |
| 4,807,516 | * | 2/1989 | Takats ................................ 91/363 A |
| 5,709,245 | * | 1/1998 | Miller .............................. 137/625.64 |
| 5,875,818 | * | 3/1999 | Takats et al. .................... 137/625.64 |

* cited by examiner

Primary Examiner—Gerald A. Michalsky
(74) Attorney, Agent, or Firm—Conrad O. Gardner

(57) ABSTRACT

A method for optical signaling for electrical switch control, and in addition, optical powering of the electrohydraulic servovalve by means of opto-electric conversion using solar cells with a battery backup and dual redundancy for reliability. Optical power sources are e.g., laser diode, LED, or high intensity lamp.

1 Claim, 4 Drawing Sheets

OPTO-ELECTRIC/HYDRAULIC SERVOACTUATION

CROSS-REFERENCE TO RELATED APPLICATIONS

This application is a continuation of prior application Ser. No. 08/960,723, filed Oct. 29, 1997, now U.S. Pat. No. 5,875,818 which is a continuation of Ser. No. 08/724,320, filed Oct. 1, 1996, now abandoned, which is a continuation of Ser. No. 08/310,959, filed Sep. 23, 1994, now abandoned.

BACKGROUND OF THE INVENTION

1. Technical Field

This invention relates to aircraft fiber-optic control systems, and in particular to opto-electric/hydraulic servoactuation.

2. Background Art

Aircraft and aerospace vehicle flight operation depend on the correct operation of flight control surfaces. The flight control surfaces of present advanced vehicles are operated by Fly-By-Wire (FBW) hydraulic actuators, where digital/analog electronic controls provide the control signals for the electrohydraulic actuators.

The flight control actuators are usually located in aircraft where they are sensitive to generic failures from EMI, EMP, RFP and lightning threats due to type of vehicle-structural materials used or lack of protection incorporated. The FBW actuation technology is well developed, and has been successfully used in certain high performance aircraft for flight control actuation. Excellent performance, reliability and maintainability have been achieved, but the system has a weakness; that of, sensitivity to generic-environmental failures. This problem can be solved or minimized through protection, such as shielding with heavy weight penalties.

In contrast, the present invention offers another solution through the usage of fiber-optic technology, called Fly-By-Light (FBL) signaling. The FBL signal transmission is immune to these generic failures. This new emerging technology can provide the proper signal transmission for actuation, which can be comparable to FBW signaling with respect to performance, reliability and maintainability; in addition to insensitivity to generic failures.

In the patent literature, U.S. Pat. No. 4,443,853 to Maciolek et al. shows an electrically controlled mechanical actuator driven by optically generated electrical power through an optically controlled switch in an electrically isolated module. Maciolek et al. however, in contrast does not show the use of dual coil with diode control, nor optically controlled dual switches, nor a power supply circuit for the dual solar cells, nor the dual servoamplifiers, nor the RS dual optical links as exemplified by embodiments of the present invention.

Further exemplary of the prior art is U.S. Pat. No. 4,132,278 to Stevens which relates to a control system for aircraft including electrohydraulic valve means, however in contrast to the present invention does not use optical means for power transfer, but uses hydraulic power exclusively to produce electrical power.

SUMMARY OF THE INVENTION

The present invention uses either a conventional or modified electrohydraulic (EH) servovalve with reduced electrical power consumption for the operation of the actuator. The EH valve of the present actuation system receives pulse width modulated electrical signals to operate its first stage valve (torque motor). The pulse width modulated signals are created by an optically controlled switching mechanism as for the valve saturation needed D.C. currents are interrupted by pulse modulated switching mechanism. Constant D.C. power supplies are provided as hereinafter described.

DESCRIPTION OF THE PREFERRED EMBODIMENTS

The Problem

The biggest problem of a Fly-By-Light (FBL) actuation system is the operation of the servovalve. The servovalve may receive fiber-optic signals, but it needs some power for operation of first stage valve mechanism. At present, the photonic technology is not best source for provision of power for safe and reliable valve operation to replace electrical power. External or internal electrical power supplies can provide sufficient power for valve operation. The external power supply may be affected by EMI and internal power supplies needs electric power generation.

When the requirement forbids external or internal electric power supplies to the valve, the following solutions are tried with variable success.

1. Laser diode signals are used to operate the mechanism of the first stage valve through heat provided by laser. This method was not successful to produce valve operation with sufficient bandwidth required for high performance aircraft, because the time requirements for heating and cooling either metals, or liquids or gases.

2. More success can be achieved in combination of fiber-optic signalincs and fluidic amplification. The valve receives fiber-optic signals, which controls the first stage of a fluidic amplifier. The speed of fluidic amplification is the main factor to determination of the valve bandwidth.

3. The signals from laser diodes are converted into electrical signals for the operation of servovalve. This type of operation is dependent upon the reliability of fiber-optic signaling in different environmental conditions.

The present invention hereinafter described, provides a unique and practical solution for the operation of an optic-electric/hydraulic servovalve and hydraulic actuation, with an emphasis on the reliability of valve operation in different environmental conditions.

Mechanization

The present system concept hereinafter described is dependent on the following principles:

1. Pulse width modulated electrical signalings from a fiber-optic controlled electrical switch to the torque motor of an electrohydraulic servovalve.

2. Optical signalings from the controller to the switching mechanism.

3. Reliable electrical D.C. power source, which can be provided either through laser diode power source or batteries or solar cells or high intensity lamps. The constant D.C. power level has to be maintained.

All the components in accordance with the above system concept are combined into one opto-electric/hydraulic valve unit and attached tot he hydraulic actuator. This valve unit receives optical power and optical control signals from Actuator Control Electronics (ACE). Additionally, it receives fluid flow from hydraulic power supply for valve and actuator operation.

Figure 1:
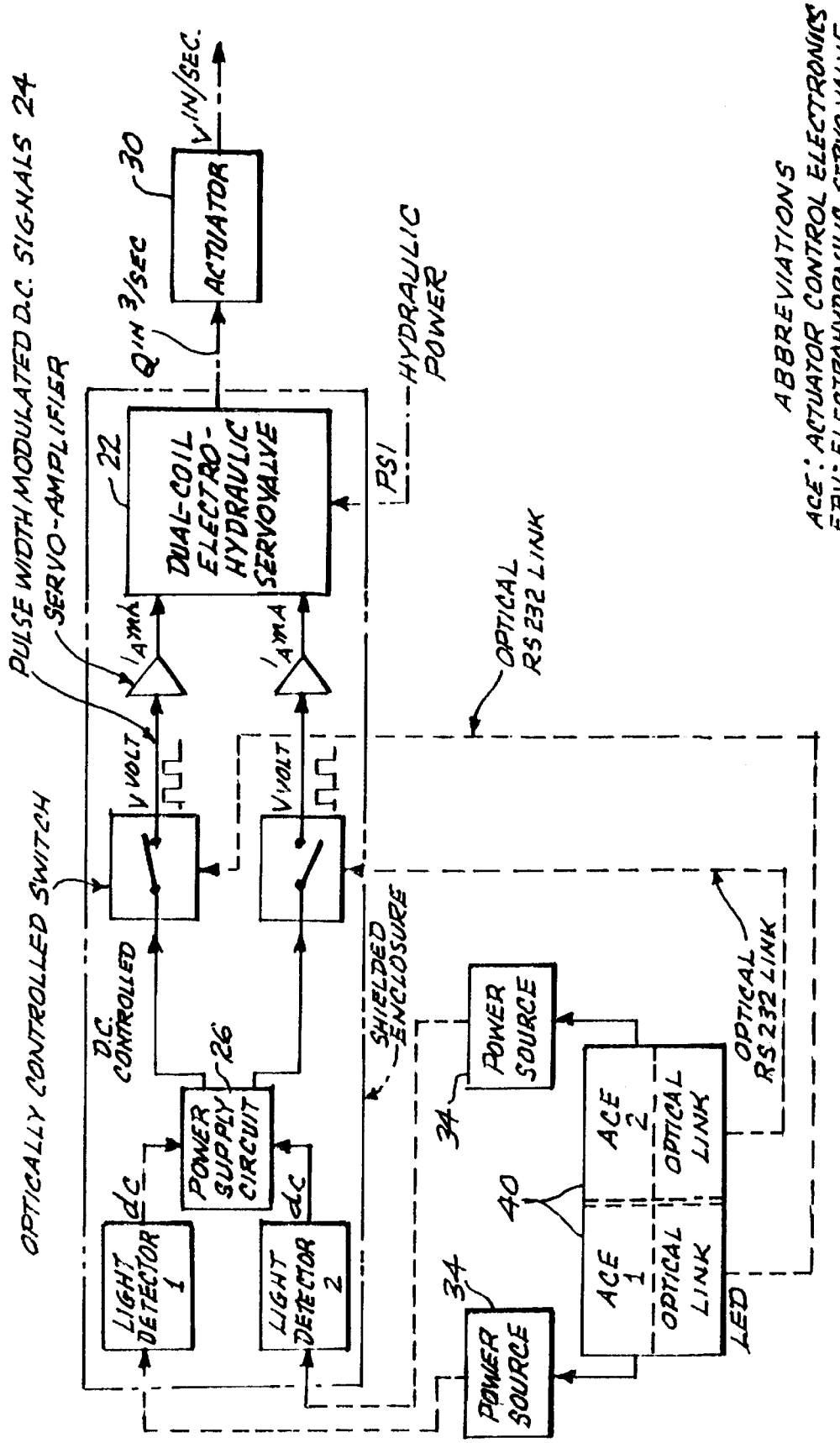
FIG. 1 is a schematic block diagram of a first embodiment of an opto-electric/hydraulic servovalve with actuator in accordance with the present invention.
Figure 2:
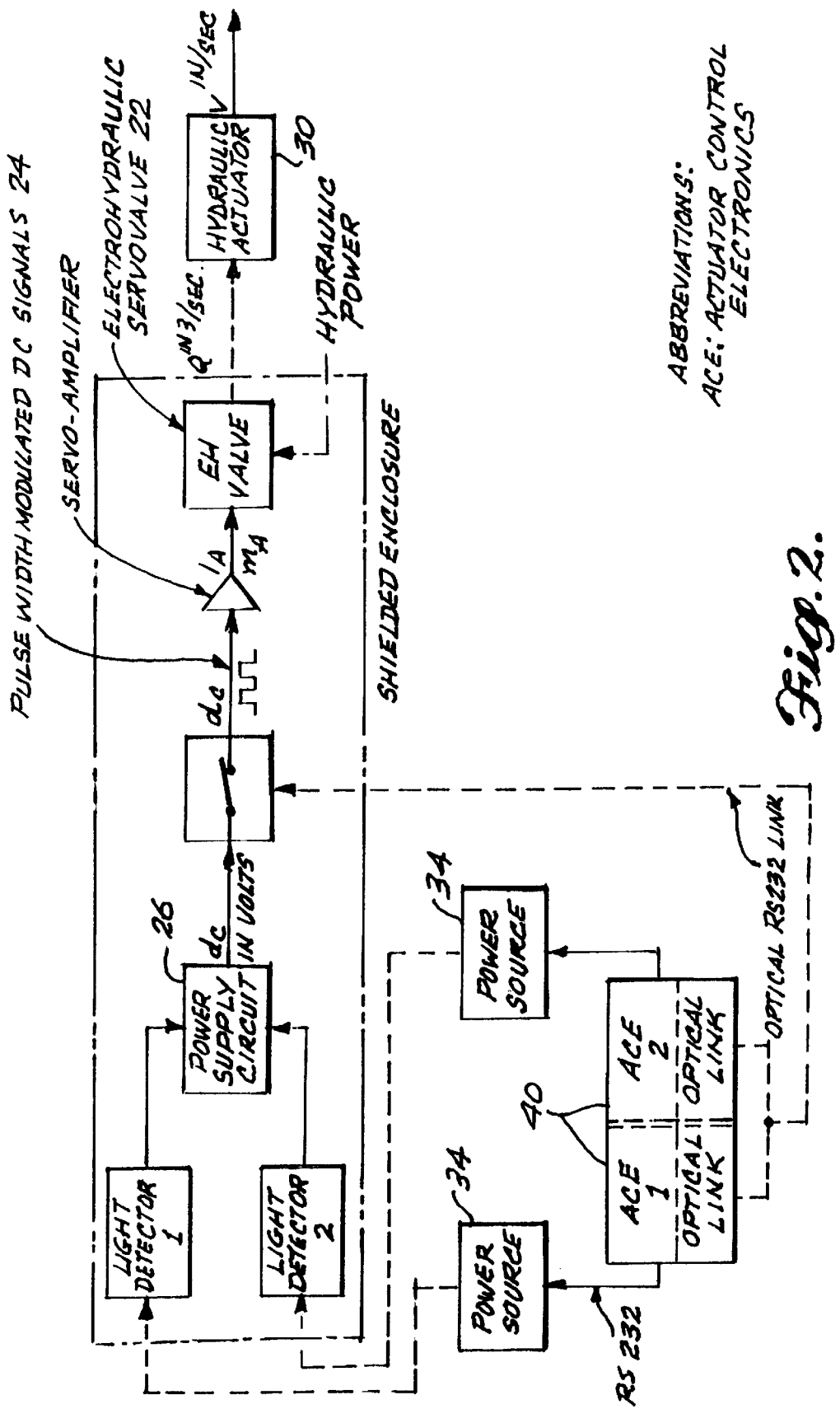
FIG. 2 is a schematic block diagram of a further embodiment of an opto-electric/hydraulic servovalve with actuator in accordance with the present invention.

Two configurations of an opto-electric/hydraulic servovalve with actuator are shown in block diagram form in FIGS. 1 and 2. The two configurations represent the same system concept, the difference is in redundancy management for improvement of reliability and safety.

The first as shown in FIG. 1, utilizes duplicate components and signalings. It is designed so each coil of a dual-coil servovalve can be operated by different fiber-optic/electric channel. The second configuration utilizing the aforementioned system concepts with one servovalve is shown in FIG. 2. FIG. 2 may be satisfactory in respect of reliability and safety, but with reduced complexity weight and cost.

Electrohydraulic Servovalve

A regular or a modified electrohydraulic servovalve 22 (modified for reduced power consumption) receives pulse width modulated electrical signals 24. The D.C. voltages of the signals are regulated by a power supply circuit 26, and interrupted by optically controlled switch via optical link to the ACE.

Electrohydraulic servovalve 22, therefore, will receive electrical step inputs (pulses) with voltages kept constant at valve saturation level. The time of the pulses are converted into differential pressure at the first stage valve of servovalve 22 and consequently into fluid flow by the second stage valve. The flow from the second stage valve to actuator 130 determines the actuator position and velocity.

Basically, electrohydraulic servovalve 22 receives step input signals equivalent to voltage and current needed for valve flow saturation and these pulses are time modulated for the required hydraulic flow and so actuator motions.

Switching Mechanism

The switching mechanism is designed to receive constant D.C. electrical inputs from power source 34, which is then pulse modulated by fiber-optic signal from the actuator controller. Therefore, the output from the switching mechanism to the electrohydraulic servovalve will be pulse modulated step signals. These step signals will be amplified to the saturation voltage level of the electrohydraulic servovalve or slightly higher.

Power Supply

The present opto-electric/hydraulic valve system needs two different type external power supplies, one optic and the other hydraulic. Additionally, it needs internal electrical power to operate the first stage valve of an electrohydraulic servovalve. This internal electrical power supply has to be locally generated or supplied by optical means.

Power source 34 for opto-electric/hydraulic servovalve 22 can be a laser diode/an LED/or hi-intensity lamp. Coupling efficiency of laser diode with 100/140 micron fiber is the best. Laser diode power supply will be controlled through an optical link by Actuator Control Electronics (ACE) 40. ACE 40 will also activate switch optically to open or close the valve by controlling D.C. voltage. Since laser diode is subject to temperature effects, stable power could become an issue. A power conditioning circuit with regulator and filter may be built in the switch.

Two methods for avoiding EHV hardover resulting from either failure in one switch operation or failure in one fiber path or in one photovoltaic device.

Method 1: Dualization switches (Fail-Passive Switching)

Figure 3:
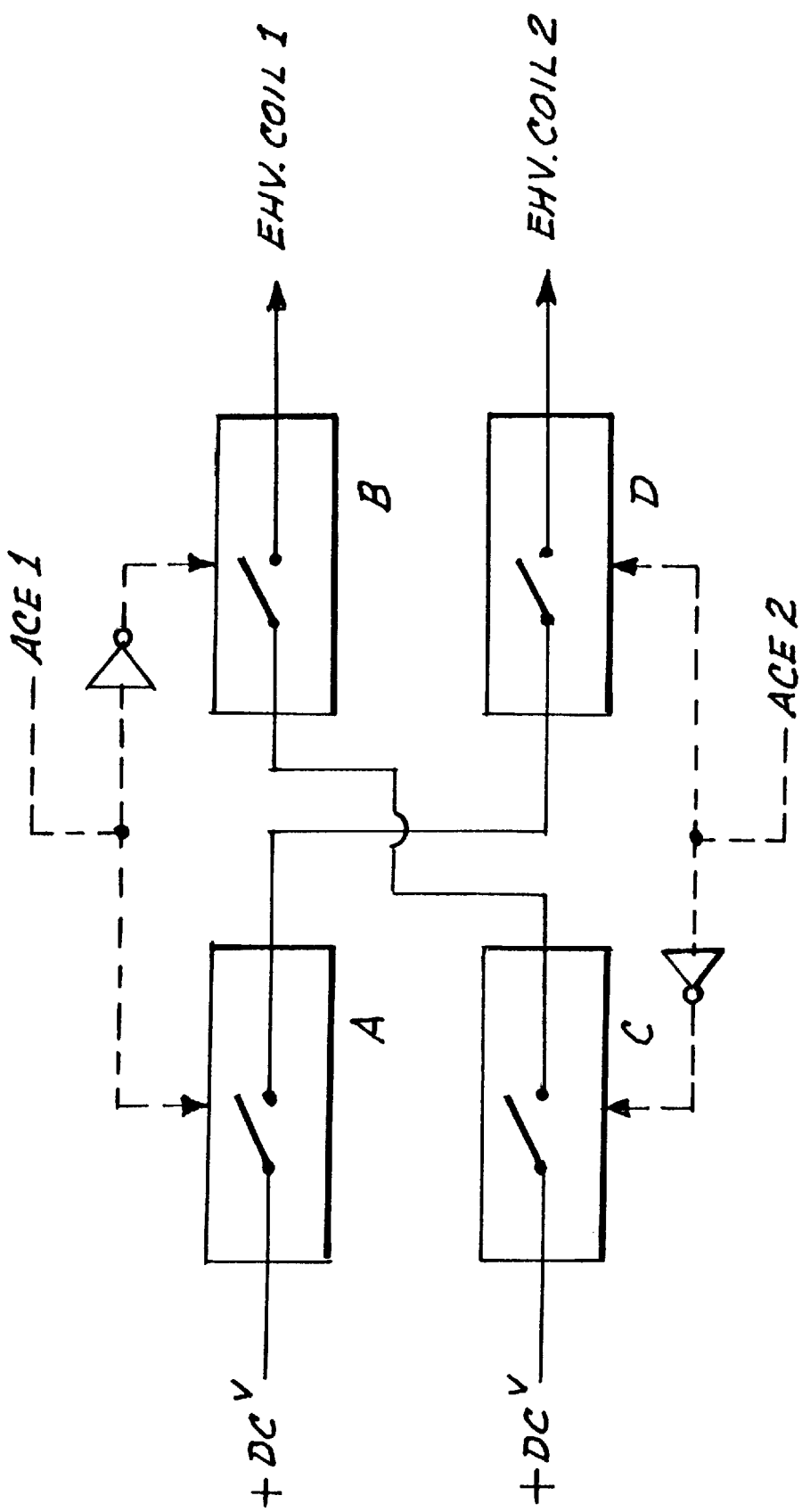
FIG. 3 is illustrative of the use of optically controlled dual-switches in the present opto-electric/hydraulic servoactuation system of FIG. 1; and, FIG. 4 is a schematic illustrative of the change in the system of FIG. 2 utilized for the elimination of hardover in any direction.

The system of FIG. 1 is modified as in FIG. 3 as each switch operation is dualized. As one switch or optical fiber path failed, the redundant switch in series can cut off any hardover failures, and the EHV will fail passively, as the other ACE will recognize the failure and takes corrective steps. The windings of EHV coils are designed to provide different direction torques. The operation of switches is shown in the following table:

|  | SWITCHES | | | | CURRENT AFTER SWITCHES | |
| --- | --- | --- | --- | --- | --- | --- |
|  | A | B | C | D | B | D |
| NORMAL OPERATION | | | | | | |
| Light from ACE 1 | Closed | Open | Open | Closed | No | Current (+) |
| Light from ACE 2 | Open | Closed | Closed | Closed | Current (−) | No |
| No Light from ACE 1 or Ace 2 | Open | Closed | Open | Closed | No | No |
| FAILURE IN OPTICAL FIBER PATH | | | | | | |
| Loss of Light From | | | | | | |
| ACE 1 | Open | Closed | Open | Closed | No | No |
| ACE 2 | Open | Closed | Open | Closed | No | No |

Figure 4:
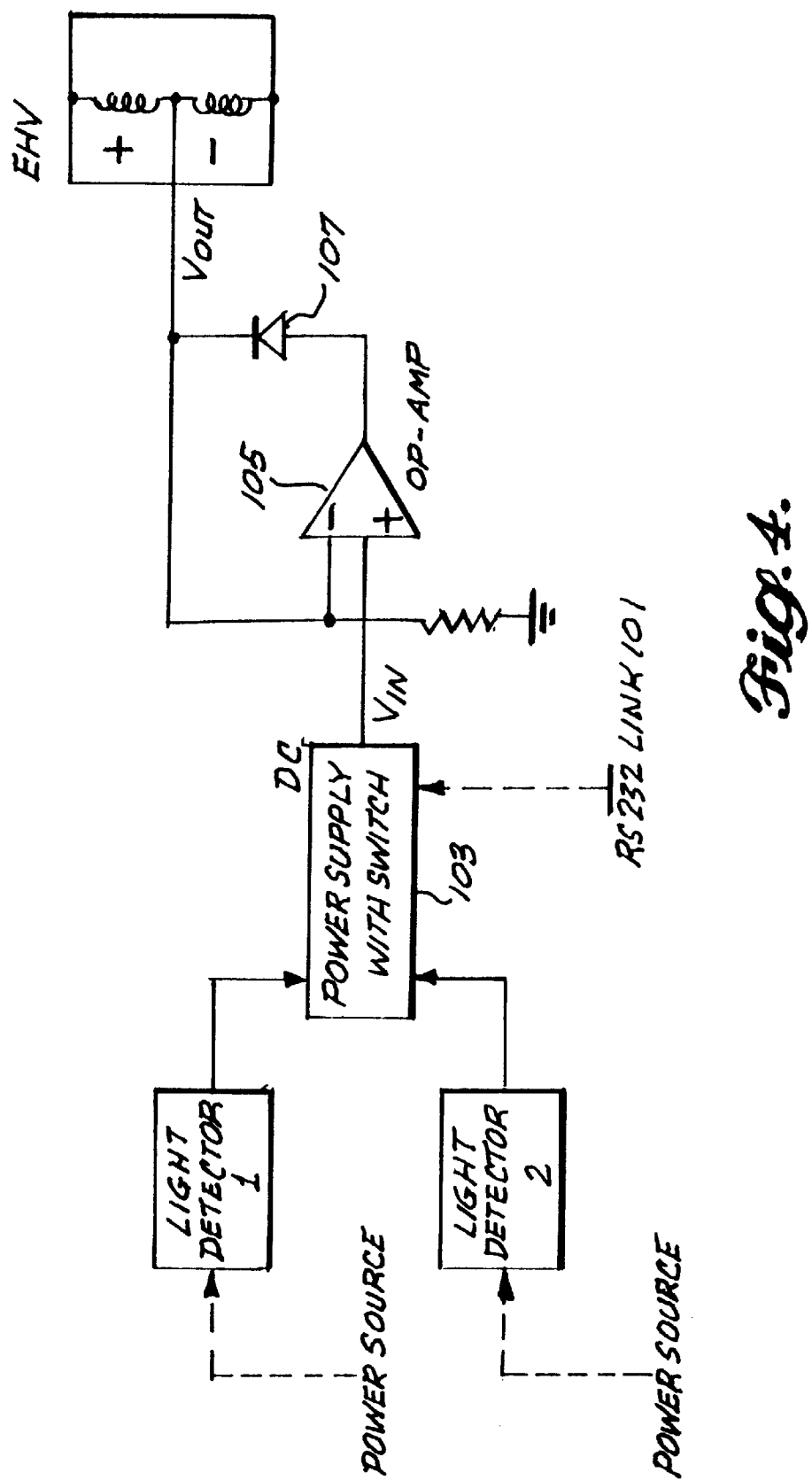

Method 2:

With the change shown in FIG. 4, the circuit of the hardover in the system of FIG. 2 in any direction can be eliminated.

A power supply with RS232 link 101 and switch 103 can be commanded for positive or negative voltage to be fed to Op-Amp 105; with Vin positive, diode 107, provides negative feed back; the output follow the input; coupled by the diode. For Vin negative Op-Amp 105 goes into negative saturation, and Vout is at ground.

Use of software for implementation of switch 103 in the power supply can be controlled for positive and negative voltages, hereby virtually eliminating the hardover problem in any specific direction.

Thus, although version aspects of the invention have been shown and described with respect to exemplary embodiments thereof, it should be understood by those skilled in the art that the foregoing and various other changes, omissions and additions may be made therein and thereto, without departing from the spirit and scope of the invention.

What is claimed is:

1. In combination:

a fail safe opto-electrohydraulic servovalve;

a power source coupled to a first light detector;

a further power source coupled to a second light detector;

a power supply with RS232 link and switch commanded for positive or negative voltage;

said first and second light detectors coupled to said power supply with RS232 link and switch commanded for positive or negative voltage; and, an operational amplifier and diode coupled in circuit between said power supply with RS232 link and switch commanded for positive or negative voltage and said fail safe opto-electrohydraulic servovalve.

* * * * *